(12) United States Patent
Hashimoto et al.

(10) Patent No.: US 7,035,868 B2
(45) Date of Patent: Apr. 25, 2006

(54) METHOD AND SYSTEM FOR DYNAMICALLY GENERATING DIGEST FROM EVENT FOOTAGE AND ASSOCIATED METADATA

(75) Inventors: Takako Hashimoto, Tokyo (JP); Atsushi Iizawa, Tokyo (JP)

(73) Assignee: Ricoh Co, Ltd., Tokyo (JP)

( * ) Notice: Subject to any disclaimer, the term of this patent is extended or adjusted under 35 U.S.C. 154(b) by 484 days.

(21) Appl. No.: 10/243,213

(22) Filed: Sep. 13, 2002

(65) Prior Publication Data

US 2003/0065657 A1 Apr. 3, 2003

(30) Foreign Application Priority Data

Sep. 14, 2001 (JP) ............................. 2001-280832

(51) Int. Cl.
*G06F 7/00* (2006.01)

(52) U.S. Cl. ..................................... 707/102; 707/100

(58) Field of Classification Search .......... 707/1–104.1
See application file for complete search history.

(56) References Cited

U.S. PATENT DOCUMENTS

| | | | | |
|---|---|---|---|---|
| 5,014,327 A | * | 5/1991 | Potter et al. ................ | 382/220 |
| 5,606,657 A | * | 2/1997 | Dennison et al. ........... | 345/501 |
| 5,713,793 A | * | 2/1998 | Holte .......................... | 463/25 |
| 6,148,308 A | * | 11/2000 | Neubauer et al. ........... | 707/203 |
| 6,337,691 B1 | * | 1/2002 | Trainor ........................ | 345/537 |
| 6,434,320 B1 | * | 8/2002 | Orth et al. ................... | 386/68 |
| 6,443,838 B1 | * | 9/2002 | Jaimet ......................... | 463/16 |
| 6,446,068 B1 | * | 9/2002 | Kortge ......................... | 707/6 |
| 6,473,084 B1 | * | 10/2002 | Phillips et al. .............. | 345/440 |
| 6,546,421 B1 | * | 4/2003 | Wynblatt et al. ........... | 709/225 |
| 6,792,418 B1 | * | 9/2004 | Binnig et al. ................ | 707/3 |
| 2001/0028790 A1 | * | 10/2001 | Numata ....................... | 386/111 |
| 2002/0083065 A1 | * | 6/2002 | Sasaki et al. ............... | 707/100 |

FOREIGN PATENT DOCUMENTS

JP 2001-119649 * 4/2001

* cited by examiner

*Primary Examiner*—Luke S Wassum
*Assistant Examiner*—Linh Black
(74) *Attorney, Agent, or Firm*—Knoble Yoshida & Dunleavy LLC

(57) ABSTRACT

A digest or summary is generated from an athletic footage containing a predetermined set of metadata. The metadata includes information on time, score and event types. Scenes are selected from the athletic footage based upon the metadata, and the scenes are significant in a flow of the game or the athletic competition. Some scenes are also selected based upon the assumption that a certain failed scoring attempt is succeeded. The above described selection scheme allows the extraction of scenes that are meaningful and significant in summarizing an athletic footage.

49 Claims, 7 Drawing Sheets

| # | t | EVENT INFORMATION | DELTA | GWP | SUCCESSFUL PLAY | | MISPLAY | | | | SIGNIFICANCE | TV DIGITAL PROGRAM | | |
|---|---|---|---|---|---|---|---|---|---|---|---|---|---|---|
| | | | | | SUCCESSFUL PLAY IMPORTANCE | SGWP | MISPLAY IMPORTANCE | PRECISENESS | MISPLAY IMPORTANCE PRECISENESS | | | A (153sec) | B (90sec) | C (47sec) |
| 1 | 1 | AWAY TEAM HEADING SHOT, FAILURE | 0 | 0.44 | | 0.298 | 0.165 | 0.10 | 0.017 | 0.017 | X | | |
| 2 | 5 | HOME TEAM SHOT, FAILURE | 0 | 0.454 | | 0.503 | 0.049 | 0.30 | 0.010 | 0.010 | X | | |
| 3 | 12 | AWAY TEAM DIRECT FREE-KICK, FAILURE | 0 | 0.45 | | 0.295 | 0.146 | 0.30 | 0.044 | 0.044 | X | | |
| 4 | 17 | AWAY TEAM SHOT, GOAL, SUCCESS | -1 | 0.292 | 0.149 | | | | | 0.149 | X | X | X |
| 5 | 21 | HOME TEAM SHOT, FAILURE | -1 | 0.272 | | 0.431 | 0.159 | 0.70 | 0.113 | 0.113 | X | X | X |
| 6 | 33 | AWAY TEAM SHOT, FAILURE | -1 | 0.222 | | 0.054 | 0.168 | 0.10 | 0.016 | 0.017 | | | |
| 7 | 53 | AWAY TEAM SHOT, FAILURE | -1 | 0.162 | | 0.080 | 0.082 | 0.30 | 0.025 | 0.025 | | | |
| 8 | 56 | AWAY TEAM SHOT, FAILURE | -1 | 0.155 | | 0.083 | 0.072 | 0.50 | 0.036 | 0.036 | X | | |
| 9 | 57 | AWAY TEAM SHOT, FAILURE | -1 | 0.150 | | 0.084 | 0.666 | 0.70 | 0.046 | 0.046 | X | X | |
| 10 | 58 | AWAY TEAM GOAL, SUCCESS | -2 | 0.084 | 0.066 | | | | | 0.066 | X | X | X |
| 11 | 60 | AWAY TEAM HEADING SHOT, SUCCESS | -3 | 0 | 0.084 | | | | | 0.084 | X | X | X |
| 12 | 71 | AWAY TEAM SHOT, FAILURE | -3 | 0 | | 0 | 0 | 0.70 | 0 | 0 | | | |
| 13 | 75 | AWAY TEAM SHOT, FAILURE | -3 | 0 | | 0 | 0 | 0.60 | 0 | 0 | | | |
| 14 | 89 | AWAY TEAM SHOT, FAILURE | -3 | 0 | | 0 | 0 | 0.50 | 0 | 0 | | | |

Fig.6

| BALL SPEED | PRECISENESS VALUES | | |
|---|---|---|---|
| | HIGH | MIDDLE | LOW |
| | 0.3 | 0.1 | 0 |
| BALL POSITION | GOALPOST | INSIDE OF A GOAL | OUTSIDE OF A GOAL |
| | 0.3 | 0.2 | 0 |
| KINDS OF SHOT | PENALTY KICK | DIRECT FREE KICK | SOLO RUN / OTHERS |
| | 0.3 | 0.2 | 0.2 / 0 |

Fig.7

| # | t | EVENT INFORMATION | DELTA | SUCCESSFUL PLAY | | MISPLAY | | | | | SIGNIFICANCE | TV DIGITAL PROGRAM | | |
|---|---|---|---|---|---|---|---|---|---|---|---|---|---|---|
| | | | | GWP | SUCCESSFUL PLAY IMPORTANCE | SGWP | MISPLAY IMPORTANCE | PRECISENESS | MISPLAY IMPORTANCE PRECISENESS | | | A (163sec) | B (90sec) | C (47sec) |
| 1 | 1 | AWAY TEAM HEADING SHOT, FAILURE | 0 | 0.44 | | 0.298 | 0.165 | 0.10 | 0.017 | | 0.017 | X | | |
| 2 | 5 | HOME TEAM SHOT, FAILURE | 0 | 0.454 | | 0.503 | 0.049 | 0.30 | 0.010 | | 0.010 | X | | |
| 3 | 12 | AWAY TEAM DIRECT FREE KICK, FAILURE | 0 | 0.45 | | 0.295 | 0.146 | 0.30 | 0.044 | | 0.044 | X | | |
| 4 | 17 | AWAY TEAM SHOT, GOAL, SUCCESS | -1 | 0.292 | 0.149 | | | | | | 0.149 | X | X | X |
| 5 | 21 | HOME TEAM SHOT, FAILURE | -1 | 0.272 | | 0.431 | 0.159 | 0.70 | 0.113 | | 0.113 | X | X | X |
| 6 | 33 | AWAY TEAM SHOT, FAILURE | -1 | 0.222 | | 0.054 | 0.168 | 0.10 | 0.016 | | 0.017 | | | |
| 7 | 53 | AWAY TEAM SHOT, FAILURE | -1 | 0.162 | | 0.080 | 0.082 | 0.30 | 0.025 | | 0.025 | | | |
| 8 | 56 | AWAY TEAM SHOT, FAILURE | -1 | 0.155 | | 0.083 | 0.072 | 0.50 | 0.036 | | 0.036 | X | | |
| 9 | 57 | AWAY TEAM SHOT, FAILURE | -1 | 0.150 | | 0.084 | 0.666 | 0.70 | 0.046 | | 0.046 | X | X | X |
| 10 | 58 | AWAY TEAM GOAL, SUCCESS | -2 | 0.084 | 0.066 | | | | | | 0.066 | X | X | X |
| 11 | 60 | AWAY TEAM HEADING SHOT, SUCCESS | -3 | 0 | 0.084 | | | | | | 0.084 | X | X | X |
| 12 | 71 | AWAY TEAM SHOT, FAILURE | -3 | 0 | | 0 | 0 | 0.70 | 0 | | 0 | | | |
| 13 | 75 | AWAY TEAM SHOT, FAILURE | -3 | 0 | | 0 | 0 | 0.60 | 0 | | 0 | | | |
| 14 | 89 | AWAY TEAM SHOT, FAILURE | -3 | 0 | | 0 | 0 | 0.50 | 0 | | 0 | | | |

METHOD AND SYSTEM FOR DYNAMICALLY GENERATING DIGEST FROM EVENT FOOTAGE AND ASSOCIATED METADATA

FIELD OF THE INVENTION

The current invention is generally related to the generation of a summary according to importance based upon metadata associated with athletic image and is particularly related to the dynamic generation of the above described summary at television sets and Internet servers.

BACKGROUND OF THE INVENTION

Digital broadcast has globally growing at a rapid pace. Accordingly in Japan, Broadcast Satellite (BS) digital broadcast has started from December, 2000, and ground digital broadcast is expected to start in 2003. With the above changes, TV viewing has rapidly changed. Not only the present real time viewing, but also non-linear as well as recorded viewing are also possible.

In the prior art of the current applicants, a digest generation system for non-linear viewing generates a digest or summary image from a program. The program includes additional program information or metadata such as an image index. The summary generation system searches an image scene that is considered to be important according to the metadata and generates a digest version of the image. In the above digest system, since the important scene includes audio data, the descriptive text for the image content has been processed based upon an idea that it is sufficient to generate an index summary.

The above prior art technology is described in detail in the following five references.

(1) "Discussion on Digest Viewing Method Using Program Index," Hashimoto et al, Image Information Media Academy, Broadcast Study Group, pp 7–12, March (1999).

(2) "Prototype For Digest Generation Method Using Program Index," Hashimoto et al, Data Engineering Workshop (DEWS' 99) on CD-ROM, March (1999).

(3) "Prototype For Digest Generation Method at Television Set," Hashimoto et al, ADBS 99, December (1999).

(4) "Discussion on Digest Description Generation Method," Shiroda et al, Information Processing, Academy DBS 120-15, January (2000).

(5) "Prototype For Digest Generation System for Soccer Match Program," Hashimoto et al, $11^{th}$ Data Engineering Workshop (DEWS 100) CD-ROM (2000).

The above prototypes have implemented the meaning analysis of the image content based upon the program additional information attached to the program image, the determination and extraction of important scenes based upon the user's interests, and the generation of the corresponding descriptive text. For example, according to the digest generation method as proposed by the applicants, when the athletic image is baseball, the importance degree is calculated for actual events such as a home run and a timely hit based upon an event pattern of metadata associated with the corresponding image. To generate a digest that reflects the flow of a game, it is necessary to accurately determine the importance of the events or plays in the athletic image and to consider the impact of the event on the game. For this reason, it is desirable to evaluate the game or match progression to consider the impact of the event on the game.

Despite the above considerations, the prior art digest generation methods fail to provide a mechanism for taking the game progression or the time line into account in determining the importance of the events or plays. The above described prior art digest generation methods thus fail to distinguish the importance of a score immediately after the beginning of a game over another score immediately before the end of the game. As a result, it is not possible to determine the importance of the events or plays in view of the game progression. For example, the importance is different for a score between immediately after the beginning of the game and immediately before the end of the game, and the importance is also different in scoring one point between a 1-0 game and a game where the score difference is larger. It is also not possible to rank the importance of each of the multiple scores in view of the game flow. For example, among eight points, the above prior art technology methods cannot determine which point is the most significant in the game progress. Furthermore, since the above prior art digest generation methods determined the importance based only on the event or play patterns, the importance of certain events such as failed but close shots without scoring in a soccer game or a close fly ball in a baseball game has not been determined. In other words, the importance has not been considered for its impact on the game flow in the athletic event. The close, but failed event is the one such as a shot or a fly that could change the score right after the failed event, but the score has not changed due to failure. For example, assuming that a soccer match ended with a 8-2 score, the importance of the close, but failed shot by the away team at the 2-2 score is more significant than that of the eighth goal by the home team because the failed shot could have reversed the score. The above described prior art technologies are not able to determined the importance of the close, but failed shot.

When the digests that are generated by the above prior art technologies are compared to those that are manually generated at broadcast stations, there is a high degree of match for the score-changing events such as goals in soccer. On the other hand, there is an extremely low degree of match for the failed events such as a close, but failed shot since the prior art technologies failed to extract these failed events. In other words, it is clearly desirable to generate a digest that matches human perception of the importance of the failed event.

Accordingly, the current invention addresses the above problems by determining the importance of the event in view of the game progression in generating digests for athletic footage. Similarly, the current invention addresses the above problems by determining the importance of the event in view of its impact in generating digests for athletic footage. Lastly, the current invention addresses the above problems by determining the importance of potentially score-changing events in view of its impact on the game and by ranking these events before generating digests for the athletic footage.

SUMMARY OF THE INVENTION

In order to solve the above and other problems, according to a first aspect of the current invention, a method of generating a digest for a series of current events from event image data associated with a predetermined set of metadata, including the steps of: generating a probability database based upon the metadata from a series of previous events that are similar to current events in the event image data; determining an importance degree value of each of the current events based upon a predetermined set of metadata in view of the probability database; selecting at least one of the current events based upon a change in the importance degree value; and extracting a portion of the event image data that corresponds to the selected one of the current events.

According to a second aspect of the current invention, a method of selecting a portion from an athletic image data containing a series of athletic events and associated metadata, the associated metadata including information on time, score and event type, including the steps of: determining an importance degree value for each of the athletic events based upon the associated metadata and a predetermined set of criteria in view of probability database; comparing the importance degree values among the athletic events to generate a comparison result indicating a change among the importance values; and selecting the portion from the athletic image data based upon the comparison result.

According to a third aspect of the current invention, a system for generating a digest for a series of current events from event image data, including: a metadata adding unit for adding a predetermined set of metadata to each of the current events in the event image data; and a digest generation device connected to the metadata adding unit and further including an importance calculation unit for determining an importance degree value to each of the current events based upon the metadata, a probability database and a predetermined set of criteria for importance degree, the digest generation device further including a scene extraction unit for selecting at least one of the current events based upon a change in the importance degree value.

According to the fourth aspect of the current invention, a recording medium containing computer instructions for generating a digest for a series of current events from event image data with a predetermined set of metadata, the computer instructions performing the tasks of generating a probability database based upon the metadata from a series of previous events that are similar to current events in the event image data; establishing a procedure to generate importance degree, determining an importance degree value of each of the current events for the importance degree based upon a predetermined set of metadata in view of the probability database, selecting at least one of the current events based upon the importance degree value, and extracting a portion of the event image data that corresponds to the selected one of the current events.

According to the fifth aspect of the current invention, a method of generating a digest from image data with metadata, including the steps of maintaining a probability database related to the metadata; inputting image data containing current events with associated metadata for each of the current events; selecting importance degree based upon a combination of successful play importance and misplay importance; generating an importance degree value for each of the current events based upon the associated metadata and the probability database according to the selected importance degree; and automatically selecting a portion of the image data based upon the selected importance degree.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 6 is a table illustrating an exemplary setting of preciseness values.

FIG. 7 is a table illustrating exemplary values of successful play importance, misplay importance and significance as calculated by the first preferred embodiment based upon the metadata of the above described soccer cup.

DETAILED DESCRIPTION OF THE PREFERRED EMBODIMENT(S)

Based upon incorporation by external reference, the current application incorporates all disclosures in the corresponding foreign priority document (JP2001-280832) from which the current application claims priority.

A first preferred method of generating a digest for athletic footage will be described in a summary. The first preferred method uses metadata that is added to athletic footage in order to determine the importance of the events in the athletic footage and generates a digest according to the importance. Initially, a predetermined function or table is provided for determining the importance that corresponds to a combination of an amount of time passed in a game and an assumed score differential in the game. Based upon the amount of passed time and the corresponding score differential for a particular event, the importance is determined using the predetermined function or table. The importance indicates a probability value (WP) for a home team to win a game given an amount of the passed time t and a score differential delta at the time t.

In the first preferred method, since the function or the table in determining the importance value includes the game time t and the time concept is incorporated, the importance value is differentiated depending upon the time of the event. Furthermore, since the function or the table in determining the importance value includes the score differential at the time of the event, the importance value is differentiated depending upon the score at the time of the event. All of the WP values are determined for the progress of the game based upon the time t of the event and the score differential delta. The event that changed the WP value in a great deal receives a high degree of importance. By determining all of the WP values, the game flow is accurately determined. Lastly, the object events are defined to be events that can potentially change the score after a certain event. After an object event, when the score changes, a first importance value is determined using the function or the table based upon the game time of the object event in the athletic footage and the score differential at the object event. Similarly, after the object event, when the score does not change, a second importance value is determined using the function or the table based upon the game time of the object event in the athletic footage and the assumed score differential. The importance value is determined based upon the above first and second importance values. Even when the score does not change as a result of the failed object event, the above determined importance value considers the impact of the event upon the game, and the ranking of the event is accurately determined.

Figure 1:
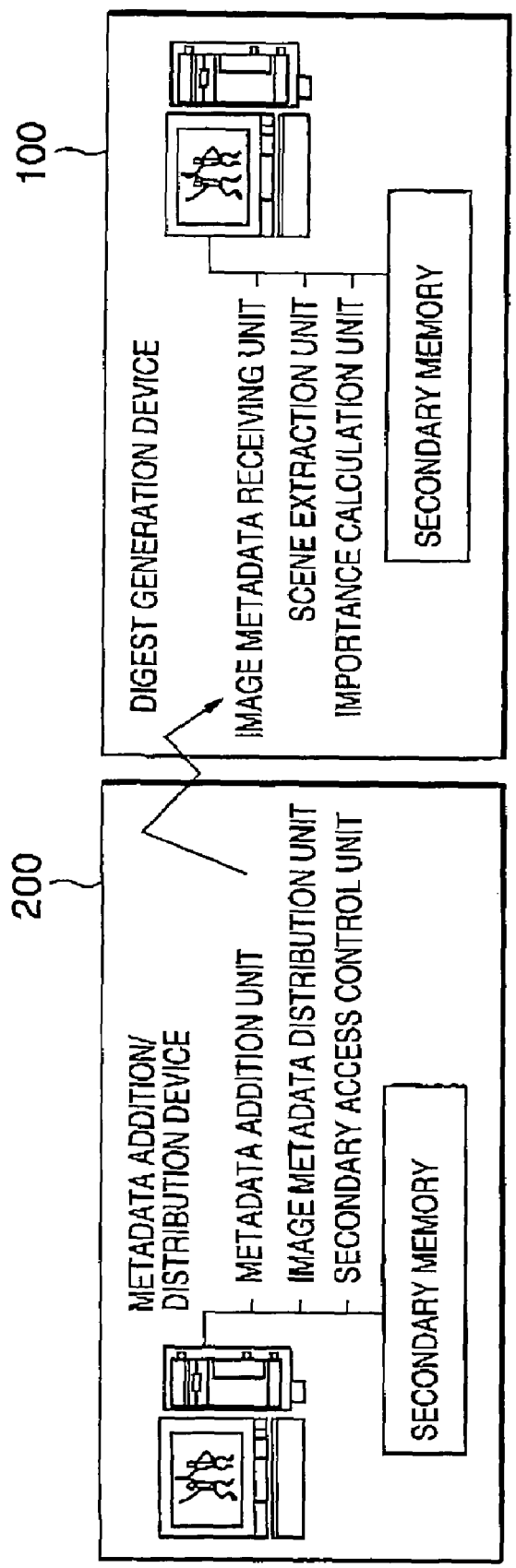
FIG. 1 is a diagram illustrating a first preferred embodiment of a digest generation device according to the current invention.

Now referring to FIG. 1, a diagram illustrates a first preferred embodiment of a digest generation device according to the current invention. For clear description, the digest generation device 100 is illustrated with a metadata addition/distribution device 200 for adding metadata to the athletic footage and distributing the footage. The digest generation device 100 is not necessarily a receiving terminal with receiving capabilities, but it is alternatively a peripheral for imputing metadata and athletic footage data from optical media such as DVD and CD-RW.

The metadata addition/distribution device 200 includes at least a central processing unit (CPU), a display unit, a metadata input terminal and a magnetic disk. The magnetic disk permanently stores image data and metadata. The time code that is defined in the metadata associates the image data and the metadata. In order to add and to transmit the metadata in real time, the metadata addition/distribution device 200 includes a software program to implement a secondary memory access control unit, a metadata addition unit and an index data distribution unit. The digest generation unit 100 includes at least a control processing unit (CPU), a display unit, a metadata interpretation unit and a magnetic disk. The magnetic disk permanently stores the athletic footage data and the metadata. The digest generation unit 100 receives the athletic footage data and the metadata in real time and extracts scenes. To calculate the importance of an event, the digest generation unit 100 includes a software program to implement a secondary memory access control unit, a footage/metadata receiving unit, a scene extraction unit and an importance calculation unit. The metadata receiving unit interprets the distributed metadata and sends the interpreted information as an event to the scene extraction unit and the importance calculation unit. The scene extraction unit extracts scenes from metadata information and includes a software program to implement various functions for searches. The importance calculation unit calculates the importance of a particular event based upon the metadata information and includes a software program to implement a function for reporting to the scene extraction unit the importance as a characteristic value of the scene.

Figure 2:
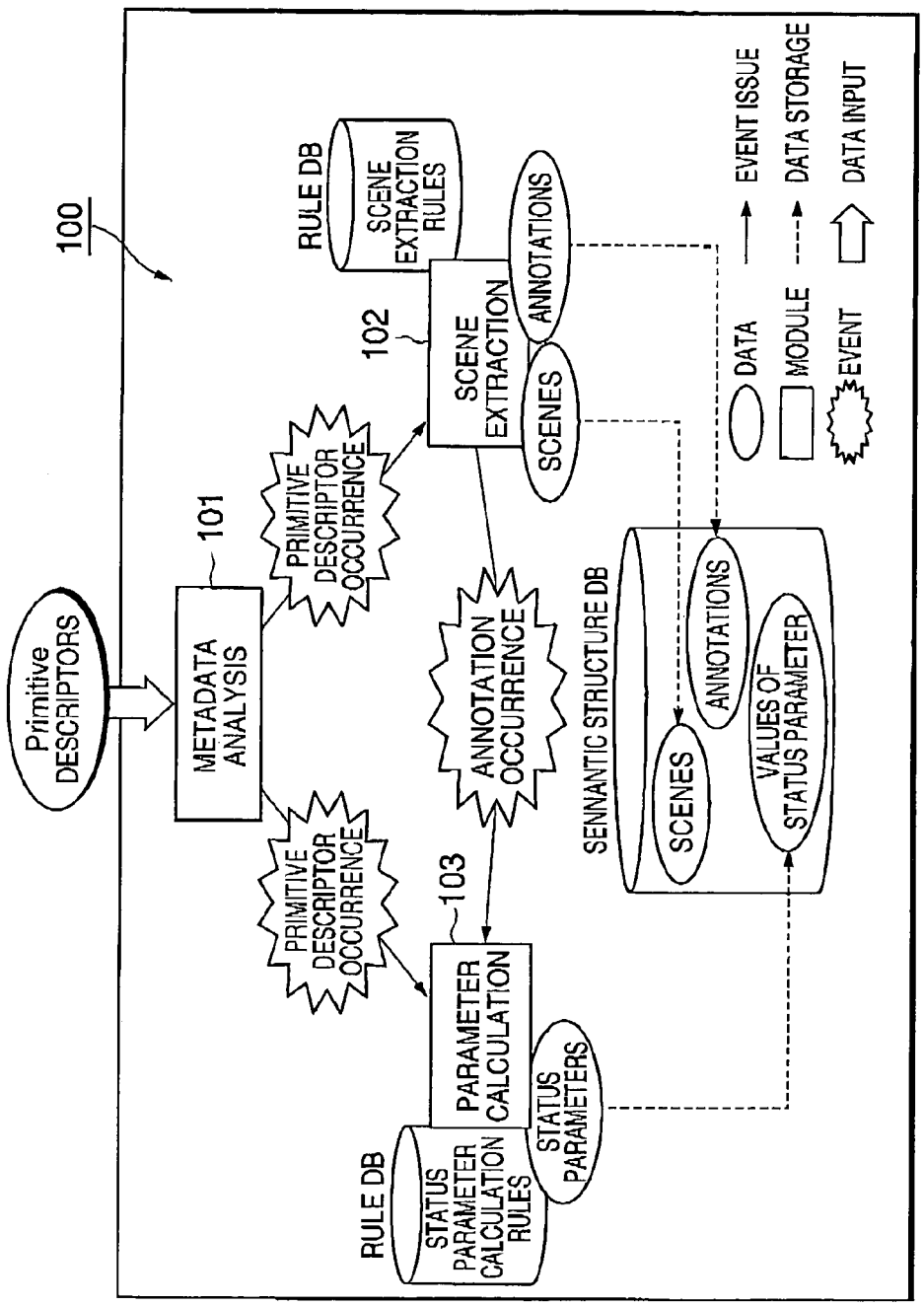
FIG. 2 is a block diagram illustrating one preferred embodiment of the digest generation device according to the current invention.

Now referring to FIG. 2, a block diagram illustrates one preferred embodiment of the digest generation device 100 according to the current invention. The preferred embodiment includes a data analysis processing unit 101, a scene extraction processing unit 102 and a parameter calculation processing unit 103. The data analysis processing unit 101 analyzes the metadata or primitive descriptors attached to the athletic footage and generates the metadata information or primitive descriptor occurrences as an event. The scene extraction processing unit 102 generates annotation for the athletic footage based upon the metadata information and extracts scenes. The parameter calculation processing unit 103 calculates WP, GWP and SGWP values as status parameters indicative of the importance of an event based upon the metadata and the annotations. Furthermore, when an annotation is generated, the scene extraction processing unit 102 issues the annotation as an event.

In the preferred embodiment, the scenes, the annotations and status parameters that have been generated by the above described processing units are stored in a semantic structured database (DB). Since the scenes, the status parameters and the annotations are not directly related to the current invention, the detailed descriptions are not provided here.

The definitions of winning probability (WP), game instance winning probability (GWP) and suppositional GWP (SGWP) will be described below with respect to the importance for the above described preferred embodiments. The WP is determined based upon a game time t and a score difference delta at the time t. Given an certain value of the t and the delta, the WP value indicates a probability of the home team for winning a particular game. In other words, WP is expressed as a function of parameters t and delta as shown below: WP (t, delta). The above WP value is statistically calculated from the past game results for the first preferred embodiment.

Figure 3:
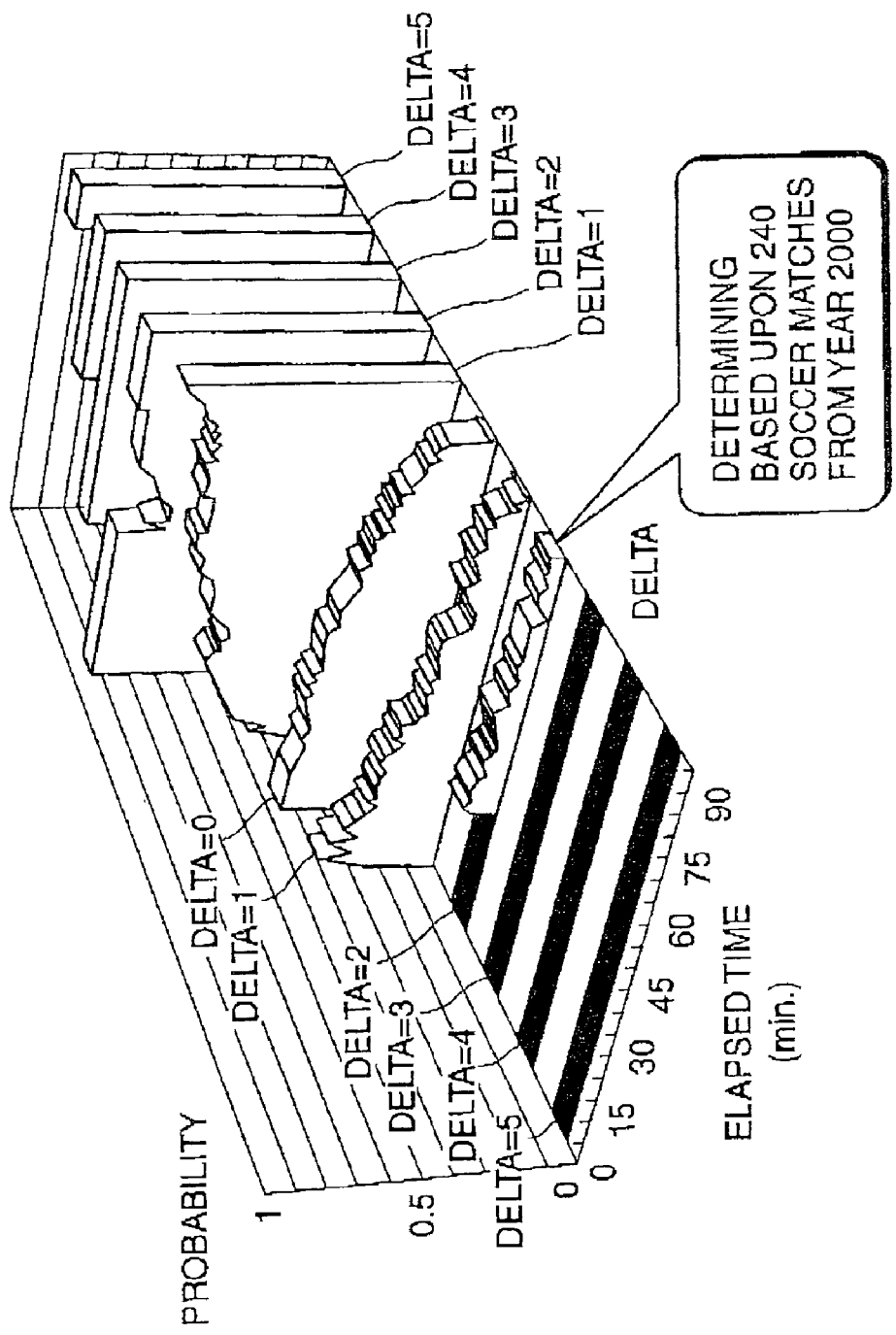
FIG. 3 is a three dimensional graph indicating an exemplary winning probability (WP) value based upon a predetermined number of games played in a soccer league division in a predetermined year.

Now referring to FIG. 3, a three dimensional graph indicates an exemplary WP value based upon two hundred forty games played in a soccer league division in the year 2000. The calculated WP value shows the following tendencies. (1) The larger the delta value is, the larger WP value becomes. Similarly, the smaller the delta value is, the smaller the WP value becomes. The delta value is defined to be the home team score minus the away team score. (2) If the delta value>0, as an amount of remaining time becomes small, the WP value becomes also large. Contrarily, if the delta value<0, as an amount of remaining time becomes small, the WP value becomes small.

Figure 4:
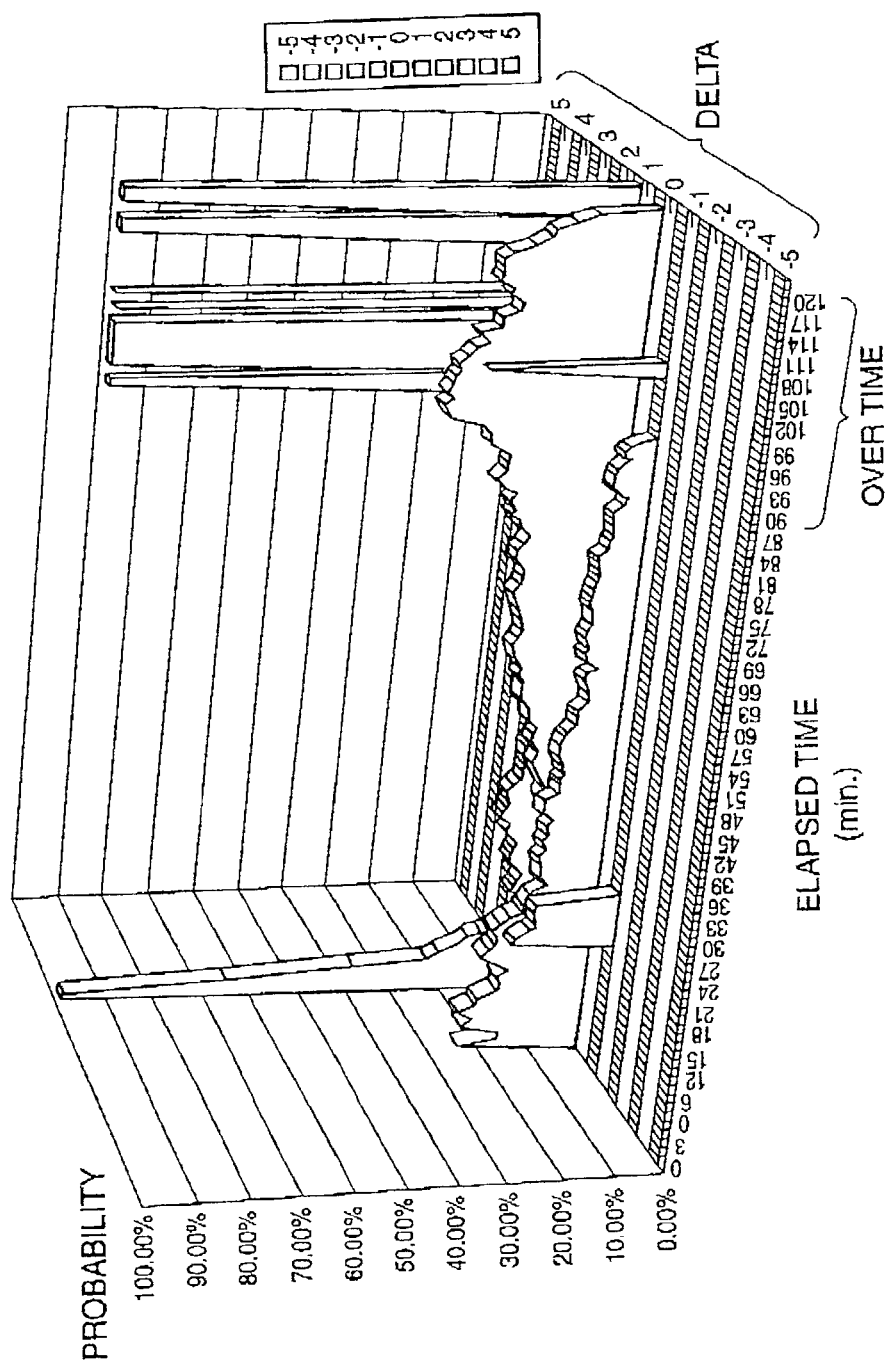
FIG. 4 is a three dimensional graph indicating the exemplary winning probability (WP) in an overtime situation.

Now referring to FIG. 4, a three dimensional graph indicates the WP in an overtime situation. The WP is calculated based upon the year 2000 data of the soccer league as shown in FIG. 3 when the score difference or the delta is three, the WP is 100% at the beginning of the overtime period. Although the WP goes down once after the beginning of the overtime, the decline is due to a small number of games in the data. For this reason, the data with a small number of games is considered to be low certainty data. The WP is determined by removing the low certainty data and by applying the polynomial approximation to the remainder of the data.

The GWP is a winning probability for an actually played game and is defined by using the WP as follows: GWP=(t, game ID)=WP(t, get_data(t, game ID)), where the above get_data is a function which returns a delta value at a specified time t in the specified game, game ID.

Figure 5:
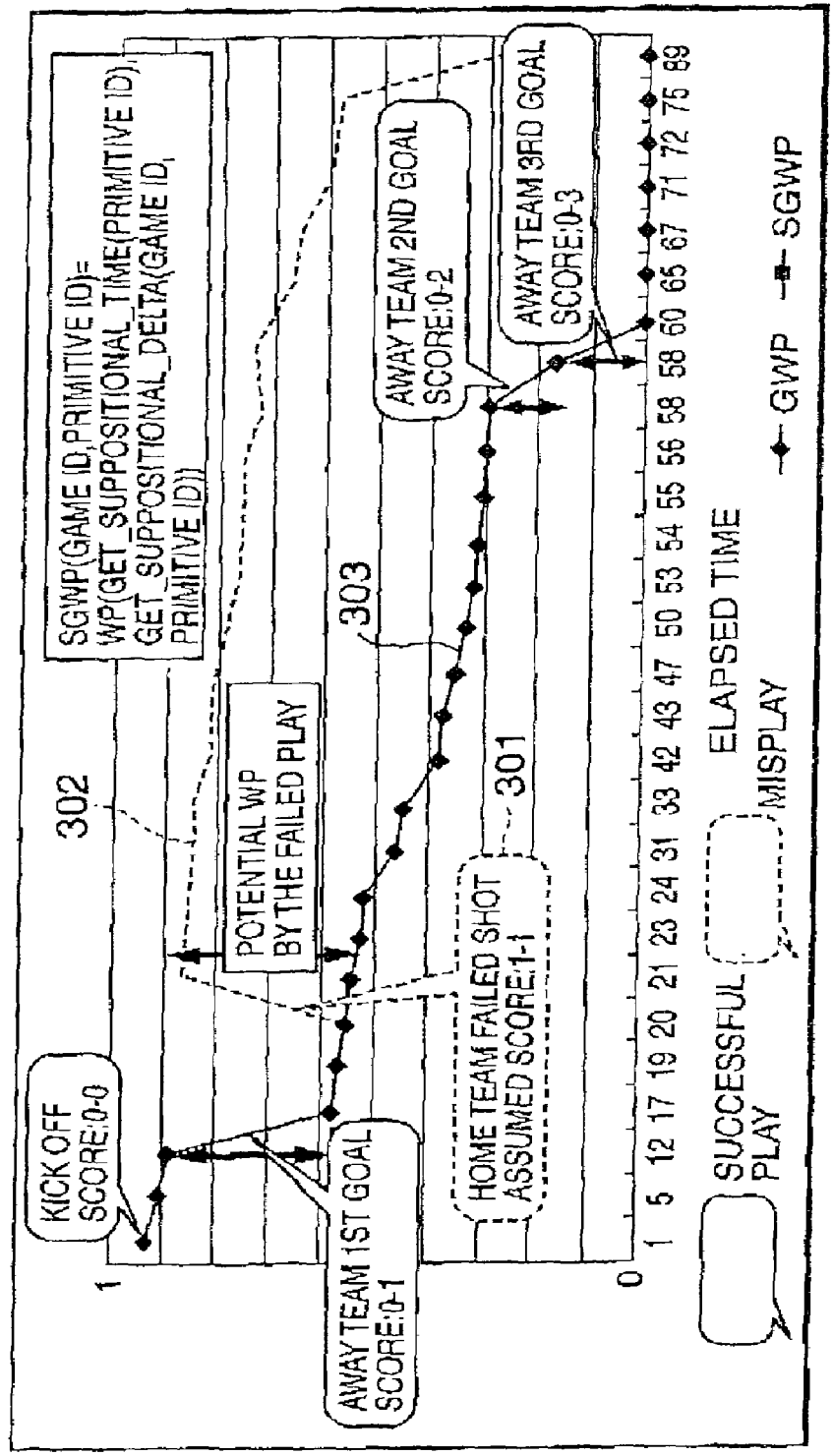
FIG. 5 is a graph illustrates an exemplary game instance winning probability (GWP) based upon a particular game data of Mar. 3, 2001 at the National Coliseum for a certain championship cup.

Now referring to FIG. 5, a graph illustrates an exemplary GWP based upon a particular game data of Mar. 3, 2001 at the National Coliseum for a certain championship cup. The game recorded three scores by the away team at 16 minutes, 56 minutes and 58 minutes. The away team won by 0-3 in this game. The GWP most significantly has changed after the initial score at 16 minutes into the game. Thereafter, the GWP has a significant change at the second score and the third score. The change in the GWP value indicates the impact by successful plays such as a goal on the game. The above GWP value change is called "successful play importance."

The SGWP is an assumed or suppositional GWP based upon the assumption that a failed event actually has succeeded. The failed events include an attempted shoot in a soccer match and a fly ball that was close enough to be a home run in a baseball game. The SGWP is defined as below: SGWP (game ID, event ID)=WP(get_suppositional_time (event ID), get_suppositional_delta (game ID, event ID)), where the above defined event ID identifies a failed event, get_suppositional_time is a function that returns a time at which the event specified by event ID has failed. Similarly, get_suppositional_delta (game ID, event ID) is a function that returns a score difference had the event specified by event ID been succeeded in the game specified by game ID.

As shown in FIG. 5, the SGWP value is shown at 301 at 20 minutes into the game after a failed shoot by the home team. If the shoot had been successful, the score difference would have been zero. The score would have been 1 to 1, and the game flow significantly would have been different. The dotted line 302 indicates the game flow after the shoot is assumed to be successful, and the score difference is assumed to be zero. The difference between SGWP 302 and the GWP 303 indicates the impact that would have affected the game flow had the failed play been successful. The above difference is called "misplay importance."

The importance in the above first preferred embodiment is expressed as follows: successful play importance=misplay importance×prec (event ID) where prec (event ID) expresses a degree to which an event as specified by event ID is close to being successful. For example, the above closeness is manually determined based upon the speed of the ball and the distance from a goal post in case of soccer.

Now referring to FIG. 6, a table illustrates an exemplary setting of preciseness values (prec(event ID)). For example, the preciseness values are predetermined for the ball speed, the ball position and kinds of shot. For the ball speed, the predetermined values include high, middle and low. Similarly, for ball position, the predetermined values include goalpost, inside of a goal, and outside of a goal. Lastly, for kinds of shot, the predetermined values include penalty kick, direct free kick, solo run and others.

Now referring to FIG. 7, a table illustrates exemplary values of successful play importance, misplay importance and significance as calculated by the first preferred embodiment based upon the metadata of the above described soccer cup. To check the validity of the first preferred embodiment, three sport news pieces were compared, and these three pieces were produced by broadcasters. If the scenes that the digest generation device 100 of the first preferred embodiment has selected are included in the sports digest as important scenes, the first preferred embodiment is effective in dynamically generating digests. As shown in FIG. 7, the digest generation device 100 ranked the events #4, #5, #11, #10 and #9 in that order based upon their significance values. With respect to TV Digest programs B and C, the first preferred embodiment of the digest generation device 100 has achieved 100% accuracy. Similarly, with respect to TV Digest program A, the first preferred embodiment of the digest generation device 100 has achieved 89% accuracy. Based upon the above accuracy result, the first preferred embodiment of the digest generation device 100 is capable of determining the importance degree that is substantially equal to a manually determined importance degree.

A second preferred embodiment of the digest generating device and method includes a table or a function for calculating an importance degree value that corresponds to a given game time in the athletic footage. An importance degree value is determined based upon the above table or function at a time of a certain event in a given athletic footage. The importance of an event is determined based upon the above determined importance degree value. That is, the second preferred embodiment uses a function that involves only a game time t as a parameter in determining the importance degree for a given event. The WP of the second preferred embodiment is determined only based upon the game time t. Given a certain game time value t, the WP indicates a probability for the home team to ultimately win at the time t. The WP is expressed by the following function that takes only the game time t as an argument: WP(t). Although the second preferred embodiment is the most simplified example, the importance degree of a game-dependent event is determined based only upon the game time t.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of generating a digest for a series of current events from event image data associated with a predetermined set of metadata, comprising the steps of:
generating a probability database based upon the metadata from a series of previous events that are similar to current events in the event image data;
determining an importance degree value of each of the current events based upon a predetermined set of metadata in view of the probability database;
selecting at least one of the current events based upon a change in the importance degree value; and
extracting a portion of the event image data that corresponds to the selected one of the current events.

2. The method of generating a digest for a series of current events from event image data according to claim 1 wherein the current events take place in an athletic competition.

3. The method of generating a digest for a series of current events from event image data according to claim 2 wherein the metadata includes elapsed time, a score differential and an event type.

4. The method of generating a digest for a series of current events from event image data according to claim 3 wherein the importance degree value is determined based upon the elapsed time in a game.

5. The method of generating a digest for a series of current events from event image data according to claim 3 wherein the importance degree value is determined based upon a combination of an amount of the elapsed time in a game and the score differential at the elapsed time in the game.

6. The method of generating a digest for a series of current events from event image data according to claim 3 wherein the importance degree value is designated by a WP, which is indicative of a probability that a home team ultimately wins at the elapsed time with the score differential based upon the probability database.

7. The method of generating a digest for a series of current events from event image data according to claim 6 wherein the importance degree value is designated by a GWP, which is indicative of a probability that a home team ultimately wins in a particular game at the elapsed time with the score differential based upon the probability database.

8. The method of generating a digest for a series of current events from event image data according to claim 7 wherein a high value in the importance degree is assigned to a particular one of the current events if the GWP substantially changes after the particular current event.

9. The method of generating a digest for a series of current events from event image data according to claim 7 wherein the importance degree value is designated by a SGWP, which is indicative of a probability that a home team ultimately wins in a particular game at the elapsed time based upon the probability database assuming that a particular failed event has successfully completed.

10. The method of generating a digest for a series of current events from event image data according to claim 9 wherein the importance degree value of each of the current events is determined according to the GWP and the SGWP.

11. The method of generating a digest for a series of current events from event image data according to claim 1 further comprising updating the probability database for generating the importance degree value based upon the current events.

12. The method of generating a digest for a series of current events from event image data according to claim 1 wherein the importance degree is generated using a predetermined function.

13. A method of selecting a portion from an athletic image data containing a series of athletic events and associated metadata, the associated metadata including information on time, score and event type, comprising the steps of:
determining an importance degree value for each of the athletic events based upon the associated metadata and a predetermined set of criteria in view of probability database;
comparing the importance degree values among the athletic events to generate a comparison result indicating a change among the importance values; and
selecting the portion from the athletic image data based upon the comparison result.

14. The method of selecting a portion from an athletic image data according to claim 13 wherein the predetermined set of the criteria is a predetermined database.

15. The method of selecting a portion from an athletic image data according to claim 13 wherein the predetermined set of the criteria is a predetermined function.

16. The method of selecting a portion from an athletic image data according to claim 13 wherein the predetermined set of the criteria is based upon a game flow.

17. The method of selecting a portion from an athletic image data according to claim 13 wherein the predetermined set of the criteria is based upon significance of a score at each of the athletic events.

18. The method of selecting a portion from an athletic image data according to claim 13 wherein the predetermined set of the criteria is based upon an assumption that a certain failed one of the athletic events actually has successfully completed.

19. A system for generating a digest for a series of current events from event image data, comprising:
a metadata adding unit for adding a predetermined set of metadata to each of the current events in the event image data; and
a digest generation device connected to said metadata adding unit and further including an importance calculation unit for determining an importance degree value to each of the current events based upon the metadata, a probability database and a predetermined set of criteria for importance degree, said digest generation device further including a scene extraction unit for selecting at least one of the current events based upon a change in the importance degree value.

20. The system for generating a digest for a series of current events from event image data according to claim 19 wherein the current events take place in an athletic competition.

21. The system for generating a digest for a series of current events from event image data according to claim 20 wherein the metadata includes elapsed time, a score differential and an event type.

22. The system for generating a digest for a series of current events from event image data according to claim 21 wherein said importance calculation unit determines the importance degree value based upon the elapsed time in a game.

23. The system for generating a digest for a series of current events from event image data according to claim 21 wherein said importance calculation unit determines the importance degree value based upon a combination of an amount of the elapsed time in a game and the score differential at the elapsed time in the game.

24. The system for generating a digest for a series of current events from event image data according to claim 21 wherein said importance calculation unit generates the importance degree value in a WP, which is indicative of a probability that a home team ultimately wins at the elapsed time with the score differential based upon the probability database.

25. The system for generating a digest for a series of current events from event image data according to claim 24 wherein said importance calculation unit generates the importance degree value in a GWP, which is indicative of a probability that a home team ultimately wins in a particular game at the elapsed time with the score differential based upon the probability database.

26. The system for generating a digest for a series of current events from event image data according to claim 25 wherein said importance calculation unit assigns a high value in the importance degree to a particular one of the current events if the GWP substantially changes after the particular current event.

27. The system for generating a digest for a series of current events from event image data according to claim 25 wherein said importance calculation unit generates the importance degree value in a SGWP, which is indicative of a probability that a home team ultimately wins in a particular game at the elapsed time based upon the probability database assuming that a particular failed event has successfully completed.

28. The system for generating a digest for a series of current events from event image data according to claim 27 wherein said importance calculation unit determines the importance degree value of each of the current events based according to the GWP and the SGWP.

29. The system for generating a digest for a series of current events from event image data according to claim 19 wherein the probability database is built based upon the metadata from a series of previous events that are similar to the current events.

30. The system for generating a digest for a series of current events from event image data according to claim 19 wherein said importance calculation unit determines the importance degree based upon a predetermined function.

31. A recording medium containing computer instructions for generating a digest for a series of current events from event image data with a predetermined set of metadata, the computer instructions performing the tasks of:
generating a probability database based upon the metadata from a series of previous events that are similar to current events in the event image data;
establishing a procedure to generate importance degree;
determining an importance degree value of each of the current events for the importance degree based upon a predetermined set of metadata in view of the probability database;
selecting at least one of the current events based upon a change in the importance degree value; and
extracting a portion of the event image data that corresponds to the selected one of the current events.

32. The recording medium containing computer instructions according to claim 31 wherein the current events take place in an athletic competition.

33. The recording medium containing computer instructions according to claim 32 wherein the metadata includes elapsed time, a score differential and an event type.

34. The recording medium containing computer instructions according to claim 33 wherein the importance degree value is determined based upon the elapsed time in a game.

35. The recording medium containing computer instructions according to claim 33 wherein the importance degree value is determined based upon a combination of an amount of the elapsed time in a game and the score differential at the elapsed time in the game.

36. The recording medium containing computer instructions according to claim 33 wherein the importance degree value is designated by a WP, which is indicative of a probability that a home team ultimately wins at the elapsed time with the score differential based upon the probability database.

37. The recording medium containing computer instructions according to claim 36 wherein the importance degree value is designated by a GWP, which is indicative of a probability that a home team ultimately wins in a particular game at the elapsed time with the score differential based upon the probability database.

38. The recording medium containing computer instructions according to claim 37 wherein a high value in the importance degree is assigned to a particular one of the current events if the GWP substantially changes after the particular current event.

39. The recording medium containing computer instructions according to claim 37 wherein the importance degree value is designated by a SGWP, which is indicative of a probability that a home team ultimately wins in a particular game at the elapsed time based upon the probability database assuming that a particular failed event has successfully completed.

40. The recording medium containing computer instructions according to claim 39 wherein the importance degree value of each of the current events is determined according to the GWP and the SGWP.

41. The recording medium containing computer instructions according to claim 31 further comprising updating the probability database for generating the importance degree value based upon the current events.

42. The recording medium containing computer instructions according to claim 31 wherein the importance degree is generated using a predetermined function.

43. A method of generating a digest from image data with metadata, comprising the steps of:
maintaining a probability database related to the metadata;
inputting image data containing current events with associated metadata for each of the current events;
selecting importance degree based upon a combination of successful play importance and misplay importance;
generating an importance degree value for each of the current events based upon the associated metadata and the probability database according to the selected importance degree; and
automatically selecting a portion of the image data based upon the selected importance degree.

44. The method of generating a digest from image data according to claim 43 wherein said automatically selecting step compares a change in the importance degree value to a predetermined threshold value.

45. The method of generating a digest from image data according to claim 43 wherein the probability database contains statistical winning statistics based upon the metadata.

46. The method of generating a digest from image data according to claim 43 wherein the successful play importance is the importance degree where a predetermined play is successfully executed.

47. The method of generating a digest from image data according to claim 43 wherein the misplay importance is the importance degree where a predetermined play is unsuccessfully executed.

48. The method of generating a digest from image data according to claim 43 wherein the metadata includes the elapsed time and score differential.

49. The method of generating a digest from image data according to claim 48 wherein the metadata additionally includes a play type and a execution status.

* * * * *